March 1, 1966 J. C. MARTIN, JR 3,237,329
CARD RACK FOR SCHEDULING
Filed Sept. 26, 1962
FIG. 1
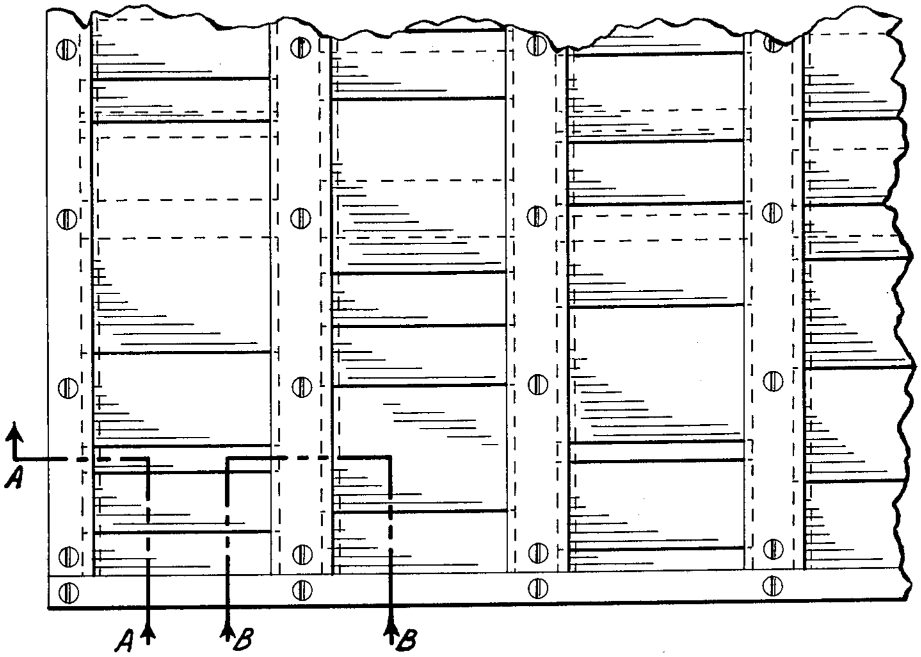
FIG. 2 SECTION A-A
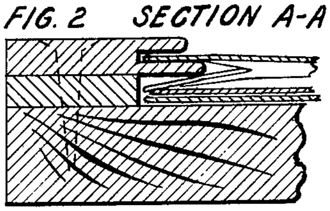
FIG. 3 SECTION B-B
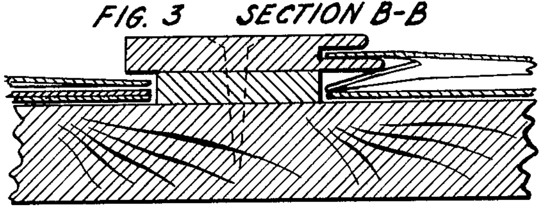
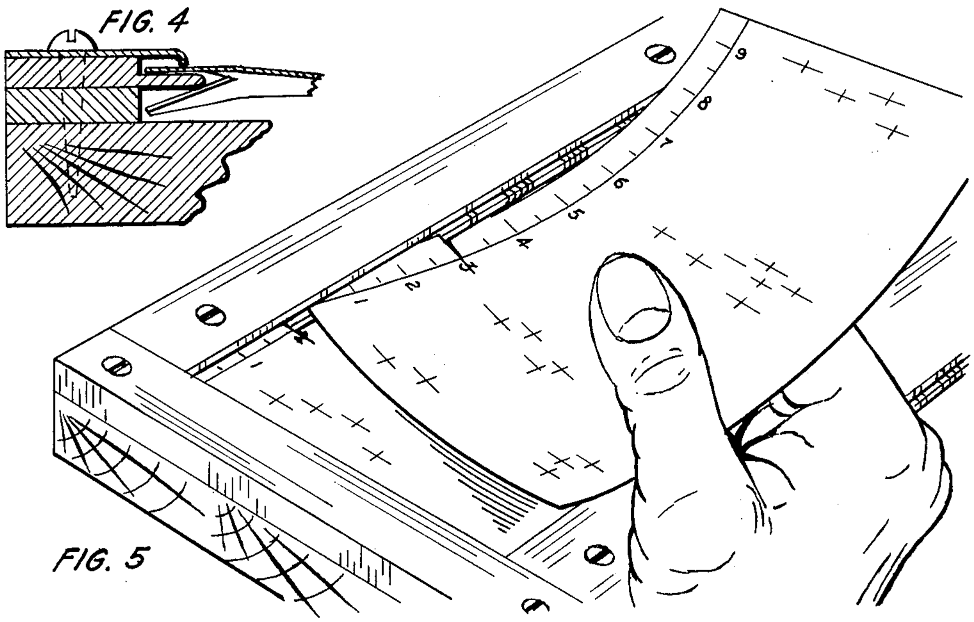
FIG. 4, FIG. 5

3,237,329

CARD RACK FOR SCHEDULING

John Calhoun Martin, Jr., 247 Inglewood Drive, Pittsburgh 28, Pa.

Filed Sept. 26, 1962, Ser. No. 226,389
2 Claims. (Cl. 40—124)

This invention has reference to a card rack which accepts a plurality of cards of uniform width and uniform or varying length and positions them so that any desired length of each card is visible.

The various possible uses of such a combination of cards are partially listed as follows: (1) to show graphically the scheduling of jobs to be performed on specific machines; (2) to indicate the man-hours of work load assigned to operators or maintenance men and at the same time to indicate the inter-relations between assignments to different men; (3) to show graphically the increments of time required for motions of one hand of an operator in relation to motion times for the other hand; (4) or any other similar relationship between a plurality of time increments, dollars, lengths, weights, or like values.

The invention described herein differs from past practice largely in the means whereby the cards are positioned with respect to each other. One previous method of obtaining a similar display of cards has been to cut the cards into desired lengths and insert them between parallel slides. This has disadvantages such as requiring extra time for card preparation plus the difficulty of handling short lengths of cards. Another commonly used method has been the overlapping of cards according to marked distances. This is inaccurate and requires extra time for re-positioning the cards whenever the position of an intermediate card is changed.

The principal features of the card rack described herein are listed as follows: (1) easy insertion or removal of individual cards, either at the end of a series of cards or at an intermediate point; (2) easy and precise designation of the length of any card that is to remain visible on the rack; (3) easy changing of the length of any card that is to remain visible on the rack; (4) easy access to the overlapped portions of each card, which can then be followed by a rapid re-positioning of all cards against positive stops; (5) accuracy of totaling graphically the visible distances for all cards; (6) flexible usage to hold any required number of cards, either in a horizontal or vertical row or in parallel rows on a board; (7) ability to select a wide range of card lengths to be shown, ranging from full card length down to a distance of one-eighth inch or less, while at the same time retaining the original size of the cards for purposes of making notations or for subsequent handling in an orderly manner; (8) inexpensive construction of the rack; (9) inexpensive nature of cards required; (10) possible direct reading of total card lengths placed in the rack by reference to a scale measurement that may be affixed to the card retaining slides; (11) possible direct reading of individual card lengths—through a suitable scale printed on the cards—both for the final card length selected and also for any length selected previously.

The rack and its application are described by the accompanying drawings and by the explanation that follows, with the exception that the drawings are not to be interpreted as a limitation on the design or arrangement of the rack or its components so long as the basic card positioning features are retained.

FIG. 1 shows a plan view of a multiple rack, with cards in place between parallel blocks. The cards overlap each other, and the visible portions of individual cards vary in length.

FIG. 2 shows a section of the rack taken through the first positioning block. The location of this section is shown as A—A in FIG. 1. The illustrated positioning block is constructed as two separate blocks, although it might be fabricated in other ways. The top portion contains a guide groove of limited cross-section, and the top and bottom portions together form a guide groove of appreciably greater cross-section. The width of the upper guide groove is approximately one and one-half times the card thickness. Such a width permits a selected card length to slide freely in the groove but does not permit the card to overlap other card lengths within the groove. The cross-section of a single card is shown positioned in the upper guide groove of FIG. 2. A portion of the card is shown to be inserted within the lower guide groove, which has a space capable of holding the maximum number of card thicknesses that would be encountered at any cross-section.

FIG. 3 shows a section of the rack taken through the second card positioning block. The location of this section is shown as B—B in FIG. 1. The left-hand portion of the cross-section contains a guide groove capable of holding the maximum number of card thicknesses that would be encountered at any cross-section of the rack. The purpose of this groove is to retain the cards within the upper guide groove of the opposite block while permitting ease of card movement length-wise within the grooves. The right-hand portion of FIG. 3 is similar to FIG. 2, being used for another row of cards.

FIG. 4 illustrates one of several alternate ways in which the superimposed upper and lower guide grooves of the positioning block might be constructed. The resulting features, except for the method of construction, are the same as described for FIG. 2.

FIG. 5 shows in perspective view how a single card is inserted into the upper and lower guide grooves of the positioning block. The card illustrated has been cut on the side, with scissors or other means, at the scale mark of unit No. 3. The bottom portion of the card is shown inserted into the upper guide groove of a positioning block such as that shown in cross-section by FIG. 2. The remaining portion of the card is shown being inserted into the lower guide groove of the block. The next step will be to insert the opposite side of the card within the single guide groove of the opposite block.

After the card has been fully positioned between the two blocks, it may be shoved firmly against the portion of the adjacent card which has been previously fitted into the upper guide groove of the positioning block. Similarly, successive cards may be inserted in like manner so that they overlap the portion of previously inserted card lengths in the lower guide groove of the block and butt against the edges of card lengths previously inserted in the upper guide groove. When removal of any card is necessary, the card overlapping it need only be shoved along the guide grooves in order to expose the card requiring removal. As this is done, all other cards above the card requiring removal are shifted a similar distance. Upon being removed from the rack, a card may be cut at a different location on the side and reinserted to expose a correspondingly different portion of the card. In order to re-position a string of cards which have been moved apart from each other, it is necessary only to shove the top-most card in the rack until the string of cards has returned to position.

In each of the cross-sectional figures, it may be observed that the positioning block is so constructed that the lower portion of the upper guide groove projects outward, forming a shelf. This is to permit easy placement of a card within the upper guide groove. The desired card portion marked by the scissors cut is first placed on this shelf of the block, after which it may be shoved directly into the upper guide groove.

Whereas the superimposed upper and lower guide grooves are shown by the drawings to be on the right-hand side of each positioning block, they may be on the left-hand side instead. It will also be preferable on some applications for both sides of a single block to be fabricated with superimposed upper and lower guide grooves. In the latter case, a multiple rack would consist of alternate blocks so constructed, with the remaining alternate blocks fabricated so that each side contained a single guide groove conforming to the cross-section shown by the left-hand portion of FIG. 3.

The materials used for fabrication of the positioning blocks may be transparent plastic, metal, or any suitable material. The board on which the positioning blocks are mounted may be constructed of wood or any other.

Having now described my invention in detail, the following claims are made:

1. In a card retaining and positioning rack, a central depressed area bounded on two sides by parallel walls, with one of the two walls having superimposed guide grooves consisting of a groove that will admit a plurality of cards and a groove having a grip limited to fit a single card, and with a projecting shelf between the superimposed grooves to facilitate loading of the upper guide groove, and with cards fitted into the rack in overlapped manner such that lengths marked by a cut on one side of each card are positioned and retained in line by the narrow guide groove of the superimposed set of grooves, and the remaining portions of the card edges on the side that is cut are retained by the groove of larger cross-section.

2. In a card retaining and positioning rack, a central depressed area bounded on two sides by parallel walls containing opposed guide grooves, with one of the two walls having a single guide groove that will admit a plurality of cards, and with the second of the two walls having superimposed grooves consisting of a groove that will admit a plurality of cards and a groove having a grip limited to fit a single card, and with a projecting shelf between the superimposed grooves to facilitate loading of the upper guide groove, and with cards fitted into the rack in overlapped manner such that lengths marked by a cut on one side of each card are positioned and retained in line by the narrow guide groove of the superimposed set of grooves, and the remaining portions of the card edges on both sides are retained by the two opposed grooves of larger cross-section.

References Cited by the Examiner

UNITED STATES PATENTS

| | | | |
|---|---|---|---|
| 398,953 | 3/1889 | East. | |
| 1,118,165 | 11/1914 | Warren | 129—16 |
| 1,199,419 | 9/1916 | Rand | 129—16 |
| 1,272,526 | 7/1918 | Rand | 129—16 |
| 1,986,015 | 1/1935 | Ross | 129—16 |
| 2,353,469 | 7/1944 | Hopp | 40—16 |
| 2,626,472 | 1/1953 | Stingl | 40—16 |

EUGENE R. CAPOZIO, *Primary Examiner.*

C. A. LEROY, JEROME SCHNALL, *Examiners.*